United States Patent
Elangovan et al.

(10) Patent No.: US 10,244,476 B2
(45) Date of Patent: Mar. 26, 2019

(54) REDUCING POWER CONSUMPTION FOR PHONE AS A KEY (PAAK) VEHICLE SYSTEM

(71) Applicant: Ford Global Technologies, LLC, Dearborn, MI (US)

(72) Inventors: Vivekanandh Elangovan, Canton, MI (US); David McNabb, Ann Arbor, MI (US); Hamid M. Golgiri, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/487,302

(22) Filed: Apr. 13, 2017

(65) Prior Publication Data

US 2018/0302859 A1    Oct. 18, 2018

(51) Int. Cl.

| | |
|---|---|
| *G07C 9/00* | (2006.01) |
| *H04W 4/02* | (2018.01) |
| *H04W 4/80* | (2018.01) |
| *H04W 52/02* | (2009.01) |
| *H04B 17/318* | (2015.01) |
| *H04W 4/04* | (2009.01) |

(52) U.S. Cl.
CPC .... *H04W 52/0235* (2013.01); *G07C 9/00309* (2013.01); *H04B 17/318* (2015.01); *H04W 4/023* (2013.01); *H04W 4/046* (2013.01); *H04W 4/80* (2018.02); *G07C 2009/00325* (2013.01)

(58) Field of Classification Search
CPC . H04W 52/0235; H04W 4/046; H04W 4/008; H04W 4/023; G07C 9/00309; G07C 2009/00325; H04B 17/318
See application file for complete search history.

(56) References Cited

U.S. PATENT DOCUMENTS

| | | | |
|---|---|---|---|
| 9,008,917 B2 | 4/2015 | Gautama et al. | |
| 9,086,879 B2 | 7/2015 | Gautama et al. | |
| 2009/0298429 A1* | 12/2009 | Nakagawa | H04M 1/7253 455/41.2 |
| 2013/0237193 A1* | 9/2013 | Dumas | G07C 9/00571 455/414.1 |
| 2014/0357293 A1* | 12/2014 | Tsaur | H04W 64/00 455/456.1 |

(Continued)

FOREIGN PATENT DOCUMENTS

DE    202016105621 U1    11/2016

OTHER PUBLICATIONS

Search Report dated Sep. 19, 2018 for GB Patent Application No. GB 1805892.5 (4 pages).

*Primary Examiner* — Lewis G West
(74) *Attorney, Agent, or Firm* — James P. Muraff; Neal, Gerber & Eisenberg LLP

(57) ABSTRACT

Method and apparatus are disclosed for reducing power consumption in a PAAK vehicle system. An example vehicle includes a main BLE module for communication with a mobile device acting as a vehicle key, a plurality of BLE antenna modules (BLEAMs), and a processor. The processor is configured for determining that the mobile device is within a threshold range of the vehicle for a threshold time period, and responsively reducing power consumption of one or more of the plurality of BLEAMs.

20 Claims, 4 Drawing Sheets

(56) References Cited

U.S. PATENT DOCUMENTS

| | | | |
|---|---|---|---|
| 2015/0028995 A1* | 1/2015 | Gautama | B60R 25/406 340/5.72 |
| 2015/0048927 A1* | 2/2015 | Simmons | G07C 9/00309 340/5.61 |
| 2015/0054618 A1 | 2/2015 | Yamane et al. | |
| 2015/0161834 A1* | 6/2015 | Spahl | G07C 9/00111 340/5.61 |
| 2015/0178532 A1* | 6/2015 | Brule | G06K 19/0717 340/5.61 |
| 2015/0287257 A1* | 10/2015 | Thompson | G07C 9/00309 340/5.72 |
| 2016/0063459 A1* | 3/2016 | Li | G06Q 20/10 705/39 |
| 2016/0063786 A1 | 3/2016 | Lewis et al. | |
| 2016/0318475 A1* | 11/2016 | Honkanen | G07C 9/00182 |
| 2016/0343187 A1* | 11/2016 | Trani | G07C 9/00119 |
| 2017/0064517 A1* | 3/2017 | Lee | G01S 5/0226 |
| 2017/0105101 A1* | 4/2017 | Santavicca | H04W 4/046 |

* cited by examiner

REDUCING POWER CONSUMPTION FOR PHONE AS A KEY (PAAK) VEHICLE SYSTEM

TECHNICAL FIELD

The present disclosure generally relates to Phone-as-a-Key (PaaK) systems for a vehicle and, more specifically, reducing power consumption by the vehicle and mobile device.

BACKGROUND

Phone-as-a-key (PAAK) technology facilitates accessing functions traditionally associated with a key fob via an app executing on a smart phone. The smart phone executing the PAAK app communicates with vehicles via a wireless network. However, some communication schemes may include multiple antenna and systems to be running at full power for communication to occur. This may cause the vehicle battery and/or the smart phone battery to be depleted quickly, resulting in a bad user experience.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for reducing power consumption in a PAAK system. An example disclosed vehicle includes a main BLE module for communication with a mobile device acting as a vehicle key. The vehicle also includes a plurality of BLE antenna modules (BLEAMs) and a processor. The processor is for determining that the mobile device is within a threshold range of the vehicle for a threshold time period, and responsively reducing power consumption of one or more of the plurality of BLEAMs.

An example disclosed method for reducing power consumption in a vehicle includes determining, by a vehicle processor, that a mobile device acting as a vehicle key is within a threshold range of the vehicle for a threshold time period. The method also includes responsively reducing power consumption of at least one BLE antenna module (BLEAM) of the vehicle, wherein the vehicle comprises a main BLE module for communication with the mobile device and a plurality of BLEAMs.

Another example may include means for determining that a mobile device acting as a vehicle key is within a threshold range of a vehicle for a threshold time period. The example may also include means for responsively reducing power consumption of at least one BLE antenna module (BLEAM) of the vehicle, wherein the vehicle comprises a main BLE module for communication with the mobile device and a plurality of BLEAMs.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
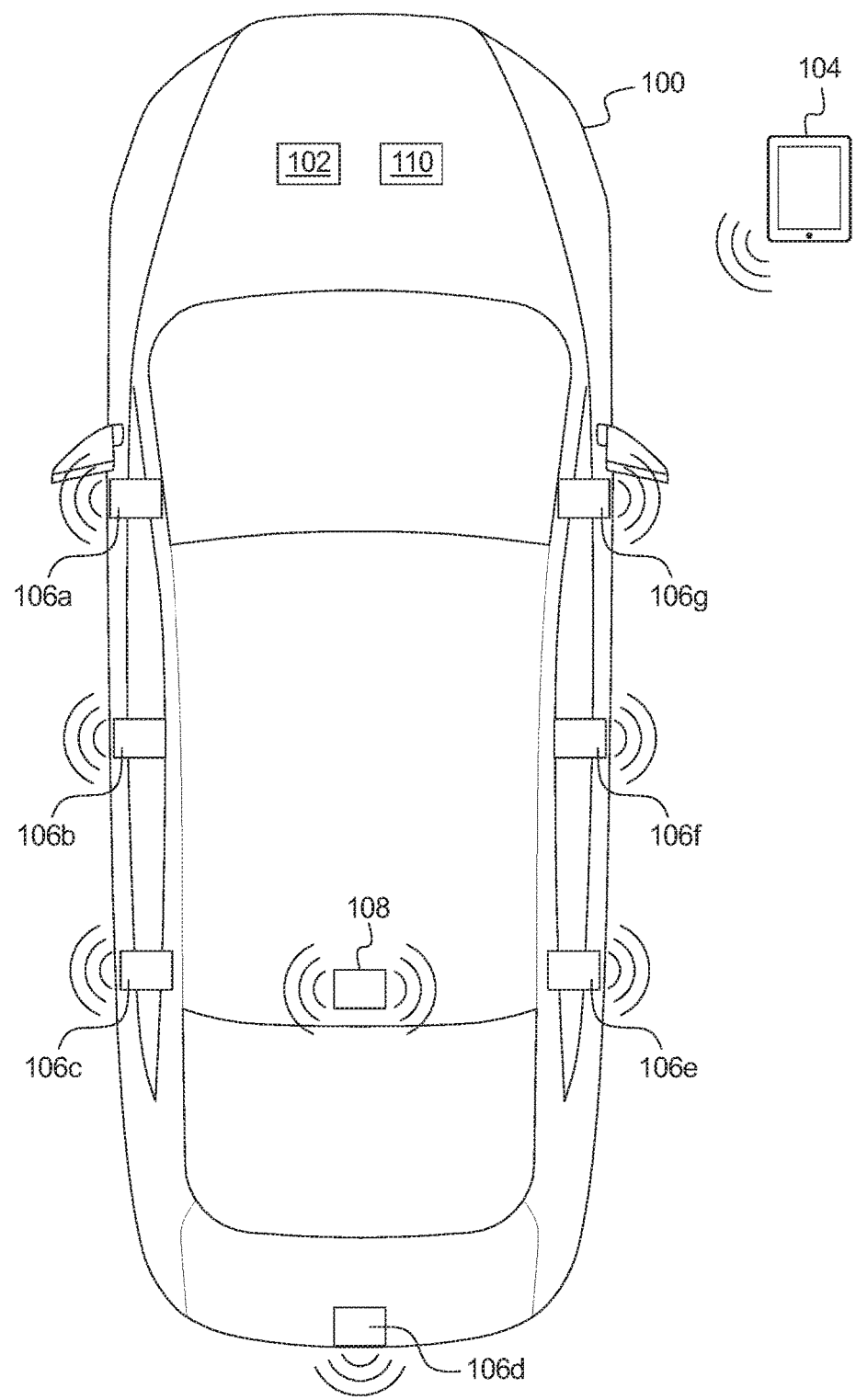
FIG. 1 illustrates an example vehicle according to an embodiment of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, PAAK technology facilitates accessing functions traditionally associated with a key fob via an app executing on a smart phone. The smart phone executing the PAAK app communicates with vehicles via a wireless network.

In a typical setup, the vehicle and app may communicate via Bluetooth Low Energy (BLE). The vehicle may have a main BLE module configured to send and receive signals via an antenna with the antenna of the smart phone. The vehicle may also have one or more BLE antenna modules (BLEAMs) at various locations inside or outside the vehicle. This communication is discussed in further detail below with respect to FIG. 2. The BLEAMs may allow for localization, signal strength detection and monitoring, and/or other functions that can be used by PAAK systems. The BLEAMs, however, may require significant power when they are on, meaning that the battery of the vehicle may be depleted quickly. Thus, in some examples the BLEAMs are switched off when the smart phone is not within range of the car (i.e., a user is away from the car). When the user approaches the car and makes a connection with the main BLE module, the BLEAMs are powered on.

But in scenarios where the user is near the car but does not intend to access the PAAK functionality, the BLEAMs may be turned on or left on, and the battery may be depleted unnecessarily. One such scenario may be when a car is parked in a garage after the user comes home from work. The user's mobile device may be in the house (within range of the vehicle in the garage), and the BLEAMs may therefore remain on. However the user may not intend to use the car until the next morning, meaning that there will be several hours of full power to the BLEAMs when they are not needed.

With this problem in mind, examples in the present disclosure may reduce the power consumption of a vehicle and/or mobile device for scenarios in which a mobile device acting as a key for the vehicle is located within range of the vehicle, such that communication between the vehicle and the mobile device would ordinarily cause a high power draw. Where the mobile device is located within range of the vehicle for a threshold period of time, it may be determined that a user of the mobile device does not wish to access the vehicle (regardless of proximity to the vehicle), and one or more BLEAMs may be switched off or put into a reduced power mode. Examples disclosed herein may then include one or more trigger events to cause the BLEAMs to be powered on or returned to their powered on state.

FIG. 1 illustrates a vehicle 100 according to an example embodiment. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include a main BLE module 102 for communication with a mobile device 104 such as a smart phone or other device that can run an PAAK application. Vehicle 100 may also include a plurality of BLEAMs 106A-G and an antenna module 108. Vehicle 100 may further include a processor 110.

BLE module 102, described in more detail below, may be configured for communication with mobile device 104 via antenna module 108. BLE module 102 may further be configured to control the plurality of BLEAMs 106A-G.

The plurality of BLEAMs 106A-G may be used for one or more purposes, such as establishing and maintaining communication with mobile device 104, determining the location of mobile device 104, and determining a signal strength of a connection between one or more BLEAMs and mobile device 104. In some examples, certain functions of the PAAK app may be available based on where the mobile device 104 is located relative the vehicle 100. For example, the unlock function may be available when the mobile device 104 is approaching from the driver's side door of the vehicle 100.

Antenna module 108 may include one or more antennas configured to transmit and receive signals using one or more protocols. For instance, main BLE module 102 may use antenna module 108 to communicate with mobile device 104 with BLE signals via the BLE protocol. The BLE protocol is set forth in Volume 6 of the Bluetooth Specification 4.0 (and subsequent revisions) maintained by the Bluetooth Special Interest Group. Antenna module 108 may be located on top of vehicle 100, to provide a line-of-sight to a greater area. Further, the location on top of vehicle 100 may mitigate signal problems that might occur due to interference from metallic parts of the vehicle 100. Antenna module 108 may also include one or more internal antennas or nodes. The internal antennas may be used to determine whether the mobile device 104 is inside the vehicle 100. In some examples, some functions of the PAAK app may be available when the mobile device 104 is located inside the vehicle 100. For example, the PAAK app may be used to start the engine of the vehicle 100 when the mobile device 104 is inside the vehicle 100. In another example, an internal antenna may be used to determine and store a signal strength between the antenna and mobile device 104, such as a strength when the vehicle is turned off. This strength may then be later referenced to determine when the mobile device has returned to the vehicle. In some examples, the internal antennas may use a personal area network protocol (e.g., Bluetooth®, Zigbee®, etc.). In some such examples, the internal wireless antennas are BLE antennas.

Processor 110 (described in more detail below), may be configured to carry out one or more actions, steps, blocks, or methods described herein. Processor 110 may be separate from or integrated with one or more systems of vehicle 100.

Figure 2:
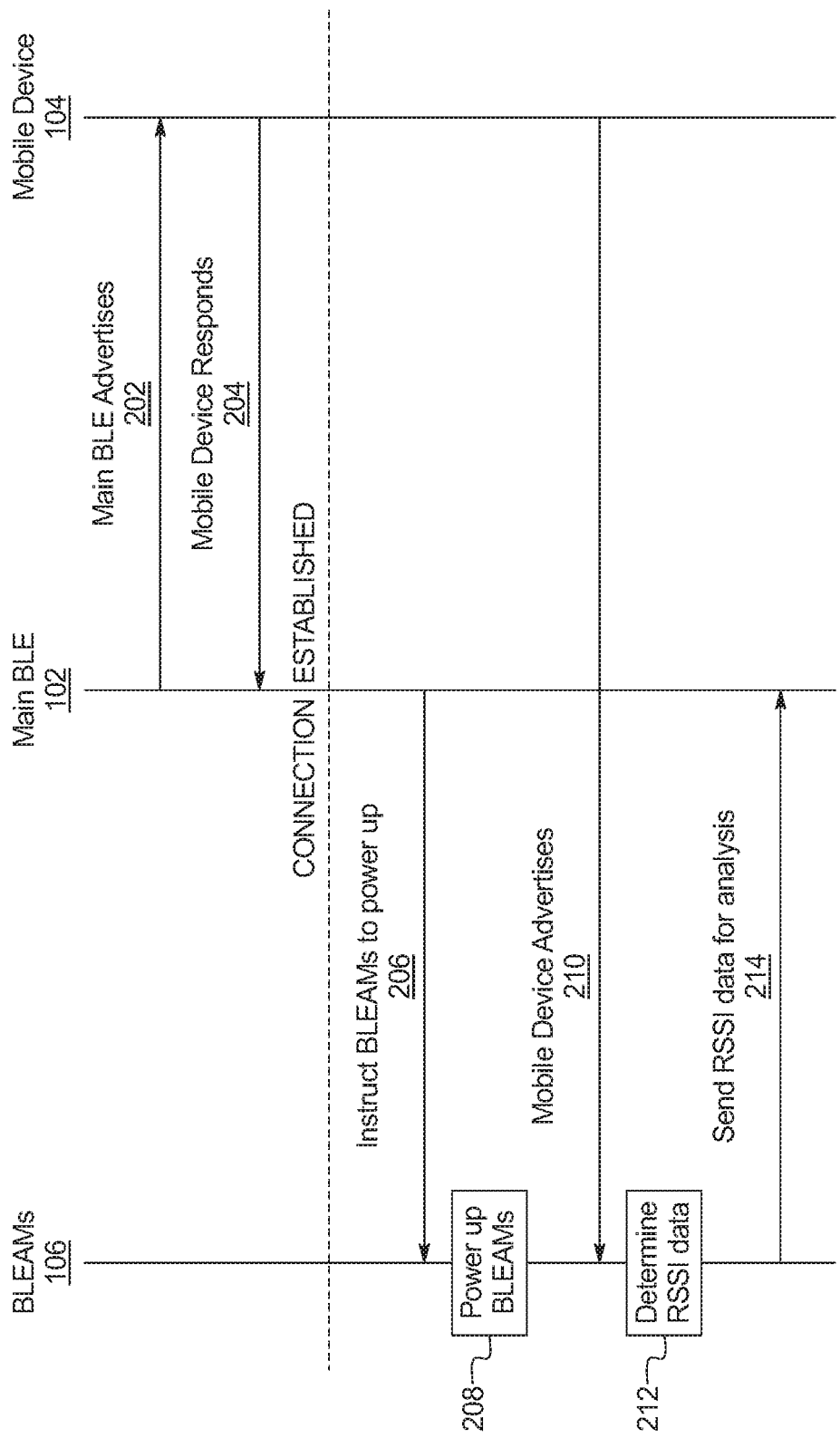
FIG. 2 illustrates an example communication diagram according to an embodiment of the present disclosure.

FIG. 2 illustrates a communication diagram 200 illustrating an example scenario of establishing communication between main BLE module 102, BLEAMs 106A-G, and mobile device 104. This example scenario begins with mobile device 104 entering a range at which it can communicate with main BLE module 102.

At step 202, main BLE module 202 advertises to mobile device 104. Main BLE module 102 may be advertising constantly, attempting to begin the process of establishing communication with mobile device 104. This may include main BLE module 102 sending out a broadcast (sometimes referred to as "polling") to determine whether there are any mobile devices 104 in the vicinity of vehicle 100. Main BLE 102 may therefore have a duty cycle, and may advertise at a particular rate, that may increase or decrease based on one or more factors.

At step 204, mobile device 104 may identify main BLE module 102 and respond back. Mobile device 104 may receive the advertisement from main BLE module 102, and determine that it is associated with a particular vehicle. In this manner, the mobile device 104 may respond only to advertisements from the main BLE module associated with the mobile device user's vehicle (i.e., to avoid establishing multiple connections in a parking lot, for example).

Once mobile device 104 responds, a connection is established. At this point, main BLE module 102 continues to communicate with mobile device 104, while also advertising in search of other mobile devices.

Via the established connection, main BLE module 102 may interrogate mobile device 104 to determine whether the app executing on mobile device 104 is authorized to access the vehicle 100. In some examples, the main BLE module 102 and mobile device 104 exchange one or more authorization tokens. Additionally, in some examples, the user of mobile device 104 may be prompted for a password and/or a biometric input, such as a fingerprint, as part of generating the authorization token to send to main BLE module 102.

At step 206, main BLE module 102 may then transmit instructions to one or more BLEAMs to turn on, or wake from a sleep mode (step 208). The instructions may also include an ID associated with mobile device 104, to distinguish it from other mobile devices.

At step 210, mobile device 104 may advertise, and one or more of BLEAMs 106A-G may receive the advertised signal. At step 212, BLEAMs may then determine one or characteristics associated with mobile device 104, such as received signal strength indication (RSSI) data and/or received transmission strength (RX) data. At step 214, this data is transmitted to the main BLE module for analysis. Meanwhile, BLEAMs 106A-G may continue to scan for signals and receive signals from mobile device 104. This may allow main BLE module 102 to determine when changes in RSSI or RX data occur, which may indicate that the mobile phone has a better line of sight to the vehicle and/or is moving with respect to vehicle 100.

Figure 3:
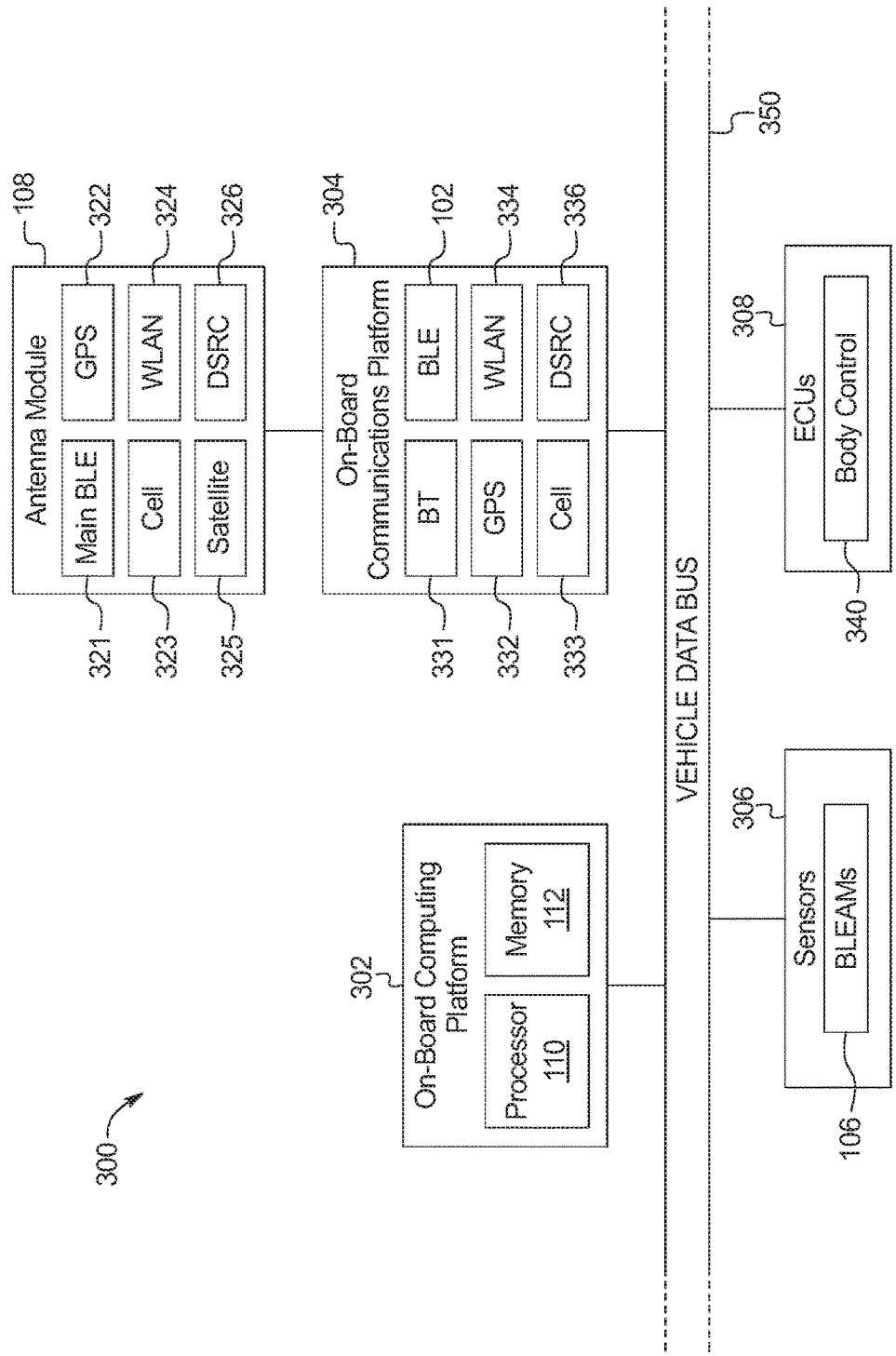
FIG. 3 illustrates an example block diagram of electronic components of the vehicle of FIG. 1, according to an embodiment of the present disclosure.

FIG. 3 illustrates an example diagram 300 showing the electronic components of vehicle 100. In the illustrated example, the electronic components 300 include the on-board computing platform 302, antenna module 108, on-board communications platform 304, sensors 306, electronic control unit 308, and vehicle data bus 350.

The on-board computing platform 302 may include a microcontroller unit, controller or processor 110 and memory 112. The processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 112 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 112 includes multiple kinds of memory, particularly volatile memory and non-volatile memory.

The memory 112 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 112, the computer readable medium, and/or within the processor 110 during execution of the instructions.

In some examples, the memory 112 may include a reference value associated with a mobile device. For instance, the reference value may be a signal strength at a moment when the vehicle is turned off. This signal strength value may be stored by memory 112 and used at a later time for one or more purposes.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Antenna module 108 includes antennas to facilitate communication with internal and/or external networks. In the illustrated example, the antenna module 108 includes the main BLE antenna 321, a GPS antenna 322, a cellular antenna 323, a wireless local area network (WLAN) antenna 324, a satellite radio antenna 325, and an antenna 326 for dedicated short range communication (DSRC). One or more of these antenna Antenna module 108 may be located on the roof of vehicle 100. Antenna module 108 may incorporate antenna for radio-based controllers installed in the vehicle 100. Antenna module 108 may include an antenna for a wireless local area network controller (e.g., wireless local area network based on IEEE 802.11a/b/g/n/ac or others, etc.), an antenna for a global positioning system (GPS) receiver, an antenna for a standards-based (e.g., cellular) controller (e.g., e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.), a satellite radio antenna, and/or an antenna for a dedicated short range communication (DSRC) controller, etc.

On-board communications platform 304 may include wired or wireless network interfaces to enable communication with the external networks. On-board communications platform 304 may also include hardware (e.g., processors, memory, storage, etc.) and software to control the wired or wireless network interfaces. In the illustrated example, the on-board communications platform 304 includes a Bluetooth module 331, a BLE module 102, a GPS receiver 332, a DSRC module 336, a WLAN module 334, and a cellular modem 333, all electrically coupled to respective antenna of antenna module 108.

The cellular modem 333 may include controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.). The WLAN module 334 may include one or more controllers for wireless local area networks such as a Wi-FI® controller (including IEEE 802.11a/b/g/n/ac or others), a Bluetooth® controller (based on the Bluetooth® Core Specification maintained by the Bluetooth Special Interest Group), and/or a ZigBee® controller (IEEE 802.15.4), and/or a Near Field Communication (NFC) controller, etc. Further, the internal and/or external network(s) may be public networks, such as the Internet; a private network, such as an intranet; or combinations thereof, and may utilize a variety of networking protocols now available or later developed including, but not limited to, TCP/IP-based networking protocols. The on-board communications platform 304 may also include a wired or wireless interface to enable direct communication with an electronic device (such as, a smart phone, a tablet computer, a laptop, etc.). The example DSRC module 336 may include radio(s) and software to broadcast messages and to establish direct connections between vehicles. DSRC is a wireless communication protocol or system, mainly meant for transportation, operating in a 5.9 GHz spectrum band.

Sensors 306 may be arranged in and around the vehicle 100 in any suitable fashion. In the illustrated example, the sensors 206 include the BLEAMs 106A-G. The BLEAMs 106A-G may be used to establish and maintain communication with mobile device 104, determine signal strength, and determine a location of the mobile device 104 relative to the vehicle 100. Sensors 306 may include one or more other sensors as well, such as one or more touch sensors, proximity sensors, magnetic sensors. In some examples, vehicle 100 may include one or more sensors located on or near the doors, configured for determining when a person has touched the door and/or is attempting to open it.

The ECUs 308 may monitor and control subsystems of vehicle 100. ECUs 308 communicate and exchange information via vehicle data bus 350. Additionally, ECUs 308 may communicate properties (such as, status of the ECU 308, sensor readings, control state, error and diagnostic codes, etc.) to and/or receive requests from other ECUs 308. Some vehicles 100 may have seventy or more ECUs 308 located in various locations around the vehicle 100 communicatively coupled by vehicle data bus 350. ECUs 308 are discrete sets of electronics that include their own circuit(s) (such as integrated circuits, microprocessors, memory, storage, etc.) and firmware, sensors, actuators, and/or mounting hardware. In the illustrated example, ECUs 308 include the body control unit 340. The example body control unit 340 controls various subsystems of the vehicle 100. For example, the body control unit 340 may control power windows, power locks, power moon roof control, an immobilizer system, and/or power mirrors, etc.

Vehicle data bus 350 may include one or more data buses that communicatively couple the on-board computing platform 302, on-board communications platform 304, the sensors 306, the ECUs 308, and other devices or systems connected to the vehicle data bus 350. In some examples, vehicle data bus 350 may be implemented in accordance with the controller area network (CAN) bus protocol as defined by International Standards Organization (ISO) 11898-1. Alternatively, in some examples, vehicle data bus 350 may be a Media Oriented Systems Transport (MOST) bus, or a CAN flexible data (CAN-FD) bus (ISO 11898-7).

Figure 4:
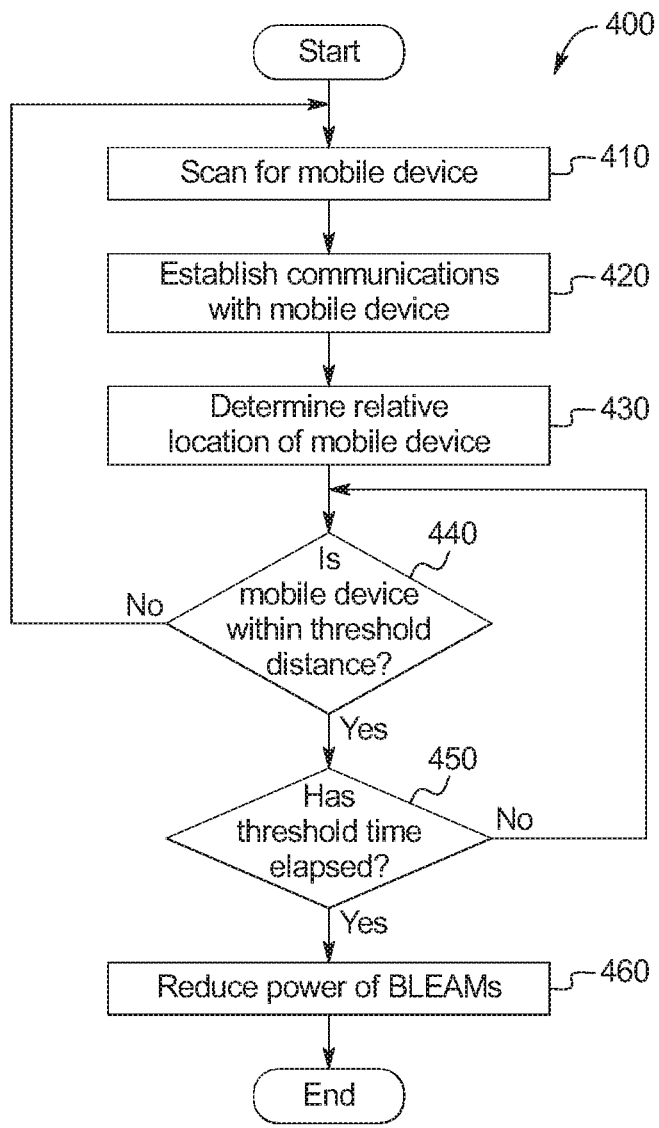
FIG. 4 illustrates a flowchart of an example method according to embodiments of the present disclosure.

FIG. 4 illustrates a flowchart 400 of an example method that may be implemented by the devices, systems, and components described herein. Method 400 may provide for reduced power consumption in a vehicle. The flowcharts of FIG. 4 is representative of machine readable instructions that are stored in memory (such as memory 112) and may include one or more programs which, when executed by a processor (such as processor 110) may cause vehicle 100 to carry out one or more functions described herein. While the example program is described with reference to the flowchart illustrated in FIG. 4, many other methods for carrying out the functions described herein may alternatively be used. For example, the order of execution of the blocks may be rearranged, blocks may be added, changed, eliminated, and/or combined to perform method 400. Further, because method 400 is disclosed in connection with the components of FIGS. 1-3, some functions of those components will not be described in detail below.

At block 410, method 400 may include scanning for a mobile device. And at block 420, method 400 may include establishing communication with the mobile device. In some examples, this may include a main BLE module of the vehicle scanning for and establishing communication with a mobile device acting as a vehicle key (i.e., PAAK). Block 410 and 420 may be performed in a manner similar or identical to steps 202 and 204 of FIG. 2.

At block 430, method 400 may include determining a relative location of the mobile device. In some examples, block 430 may include determining that the mobile device is within a threshold distance or threshold range of the BLE module and/or vehicle. For instance, the threshold may be ten meters. In some examples, the threshold may depend on the signal strength, such that determining the mobile device location may entail determining that the mobile device is close enough to the main BLE module and/or vehicle that information may be exchanged.

In some examples, method 400 may further or alternatively entail determining a more specific location relative to the main BLE module and/or vehicle. For example, the method may include determining a side of the vehicle on which the mobile device is located. If one or more BLEAMs on a first side of the vehicle have a stronger connection to the mobile device than one or more BLEAMs on a second side of the vehicle, it may be determined that the mobile device is located on the side having a stronger connection.

At block 440, method 400 may include determining whether the mobile device is within a threshold distance of the vehicle. As mentioned above, this may include determining that the mobile device is within ten meters, or some other threshold. Making this determination may include one or more BLEAMs and/or a main BLE module receiving a signal from the mobile device, and responsively determining RSSI data. The RSSI data may then be used to determine a distance between the BLEAMs, main BLE module, and the mobile device. In the event the mobile device is not within the threshold distance from the vehicle, method 400 may start over.

Where the mobile device is within the threshold distance from the vehicle, block 450 may include determining whether a threshold time has elapsed. In some examples, the threshold time may be ten minutes. Other threshold time periods may be used as well. In some examples, the threshold time may be selected such that it is long enough to avoid unintentionally activating block 460 (i.e., to avoid unintentionally reducing power of the BLEAMs). A threshold time of several minutes may be long enough to avoid unintentionally reducing power, while being short enough to prevent unnecessary power consumption by the BLEAMs when they are not needed.

If the threshold time has not elapsed, method 400 may include returning to block 440 to wait and/or make sure that the mobile device is still within the threshold range.

Method 400 may also include determining that the mobile device is not stationary during the threshold time period. This may include, for example, one or more BLEAMs and/or the main BLE module receiving and determining RSSI or RX values for the mobile device over time If it is determined that the mobile device is within a threshold distance of the vehicle for a threshold period of time, block 460 may include responsively reducing power consumption of one or more of the plurality of BLEAMs. In some examples, reducing power consumption may include (a) powering off one or more BLEAMs, (b) putting one or more BLEAMs into a sleep mode, (c) reducing a duty cycle of one or more BLEAMs, (d) powering off, putting into sleep mode, or reducing a duty cycle of a subset of BLEAMs located on one side of the vehicle (e.g., the side opposite a side on which the mobile device is located), or (e) any combination of (a)-(d) performed on some or all of the BLEAMs.

Method 400 may further include transmitting an instruction to the mobile device configured to cause the mobile device to reduce power consumption. As described above, communication between the main BLE module, BLEAMs, and mobile device may be established. As part of this connection, the mobile device may have an elevated power consumption due to the use of BLE antennas, programs running on the phone for the purpose of BLE communication, or for some other reason. Method 400 may include sending an instruction to the mobile device that may cause the mobile device to turn off, power down, go into sleep mode, power off one or more antennas or put the antennas into a sleep mode, or otherwise reduce the power consumption of the mobile device.

In some examples, method 400 may further include determining that a user has attempted to access the vehicle, and responsively increasing power consumption of one or more of the plurality of BLEAMs. Determining that the user has attempted to access the vehicle may determining that the door handle has been touched or is about to be touched, that the mobile device is in close proximity to the vehicle, or some other indication. Further, increasing the power consumption of the BLEAMs may include powering the BLEAMs on, waking them from a sleep mode, changing a duty, cycle, or otherwise allowing the BLEAMs to consume more power.

In some examples, method 400 may further include determining that an increase in signal strength between the main BLE module and the mobile device has surpassed a threshold increase, and responsively increasing power consumption of one or more of the plurality of BLEAMs. For instance, a signal strength between the main BLE module and the mobile device may be monitored. The signal may increase due to one or more factors, such as (a) opening a door between the mobile device and main BLE module to create a line-of-sight, (b) opening the garage door to create a line-of-sight, and (c) moving the mobile device from the back of the house to the front, creating a line-of-sight. The threshold increase in signal strength may be, for example, a 50% increase. Other thresholds are possible as well.

Method 400 may include determining a reference signal strength between the main BLE module and the mobile device, and later using the reference signal strength as a trigger to increase the power consumption of one or more of the plurality of BLEAMs. For example, the reference signal strength may be measured at a time when the vehicle is turned off. In that scenario, the mobile device may be located in a pocket of driver of the vehicle or otherwise inside the vehicle, and as such the reference signal strength may be relatively high. Then, at a later time, the user may move toward the vehicle from far away, and the signal strength may be monitored. When the monitored signal strength matches, is equal to, or is within a threshold range of the reference signal strength, that may indicate that user is close to the car again (e.g., standing outside the door). The BLEAMs may responsively turn on, power up, or awake from sleep mode.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a main BLE module for communication with a mobile device acting as a vehicle key;
    a plurality of BLE antenna modules (BLEAMs); and
    a processor for:
        responsive to determining that the mobile device is within a threshold distance from the main BLE module to a location outside the vehicle for a threshold time period,
        reducing a power consumption of one or more of the plurality of BLEAMs.

2. The vehicle of claim 1, wherein the processor is further for:
    determining that the mobile device is not stationary during the threshold time period.

3. The vehicle of claim 1, wherein the processor is further for:
    transmitting an instruction to the mobile device to reduce a power consumption of the mobile device.

4. The vehicle of claim 1, wherein reducing the power consumption of one or more of the plurality of BLEAMs comprises turning off all BLEAMs.

5. The vehicle of claim 1, wherein reducing the power consumption of one or more of the plurality of BLEAMs comprises turning off a subset of the BLEAMs.

6. The vehicle of claim 1, wherein the processor is further for:
    determining a side of the vehicle on which the mobile device is located,
    wherein reducing the power consumption of one or more of the plurality of BLEAMs comprises turning off one or more BLEAMs on a side opposite the determined side of the vehicle.

7. The vehicle of claim 1, wherein reducing the power consumption of one or more of the plurality of BLEAMs comprises reducing a duty cycle of one or more BLEAMs.

8. The vehicle of claim 1, wherein the processor is further for:
    determining that a user of the vehicle has attempted to access the vehicle; and
    responsively increasing the power consumption of one or more of the plurality of BLEAMs.

9. The vehicle of claim 1, wherein the processor is further for:
    determining that an increase in signal strength between the main BLE module and the mobile device has surpassed a threshold increase; and
    responsively increasing the power consumption of one or more of the plurality of BLEAMs.

10. The vehicle of claim 1, wherein the processor is further for:
    determining a reference signal strength between the main BLE module and the mobile device at a time the vehicle was last operated;
    determining that a current signal strength is equal to the reference signal strength; and
    responsively increasing the power consumption of one or more of the plurality of BLEAMs.

11. A method of reducing vehicle power consumption comprising:
    establishing communication between a main BLE module of a vehicle and a mobile device acting as a vehicle key; and
    responsive to determining, by a vehicle processor, that the mobile device is within a threshold distance from the main BLE module to a location outside the vehicle for a threshold time period,
    reducing a power consumption of at least one BLE antenna module (BLEAM) of the vehicle,
    wherein the vehicle comprises a main BLE module for communication with the mobile device and a plurality of BLEAMs.

12. The method of claim 11, further comprising:
    determining that the mobile device is not stationary during the threshold time period.

13. The method of claim 11, further comprising:
    transmitting an instruction to the mobile device to reduce a power consumption of the mobile device.

14. The method of claim 11, wherein reducing the power consumption of at least one BLE antenna module (BLEAM) of the vehicle comprises turning off all BLEAMs.

15. The method of claim 11, further comprising:
    determining a side of the vehicle on which the mobile device is located,
    wherein reducing the power consumption of at least one BLE antenna module (BLEAM) of the vehicle comprises turning off at least one BLEAM on a side opposite the determined side of the vehicle.

16. The method of claim 11, wherein reducing the power consumption of at least one BLE antenna module (BLEAM) of the vehicle comprises reducing a duty cycle of one or more BLEAMs.

17. The method of claim 11, further comprising:
determining that a user of the vehicle has attempted to access the vehicle; and
responsively increasing the power consumption of at least one BLE antenna module (BLEAM) of the vehicle.

18. The method of claim 11, further comprising:
determining that an increase in signal strength between the main BLE module and the mobile device has surpassed a threshold increase; and
responsively increasing the power consumption of at least one BLE antenna module (BLEAM) of the vehicle.

19. The method of claim 11, further comprising:
determining a reference signal strength between the main BLE module and the mobile device at a time the vehicle was last operated;
determining that a current signal strength is equal to the reference signal strength; and
responsively increasing the power consumption of at least one BLE antenna module (BLEAM) of the vehicle.

20. A vehicle comprising:
a main BLE module for receiving a signal from a mobile device acting as a vehicle key;
a plurality of BLE antenna modules (BLEAMs); and
a processor for:
responsive to determining that a strength of the signal is at or above a threshold level for a threshold time period, reducing a power consumption of one or more of the plurality of BLEAMs, the threshold level corresponding to a signal strength established when the mobile device is positioned outside the vehicle and at a predetermined distance from the main BLE module.

* * * * *